United States Patent [19]

Auchinleck

[11] 4,287,409
[45] Sep. 1, 1981

[54] READER WITH SPECIAL MEANS FOR TRANSPORTING CARDS AND BADGES OF VARIABLE THICKNESSES

[75] Inventor: Richard J. Auchinleck, Norristown, Pa.

[73] Assignee: Peripheral Dynamics, Inc., Norristown, Pa.

[21] Appl. No.: 11,197

[22] Filed: Feb. 12, 1979

[51] Int. Cl.³ .......................... G06K 13/00; B65H 5/02
[52] U.S. Cl. ..................................... 235/475; 271/274
[58] Field of Search ..................... 271/274, 273; 360/2; 235/475, 480, 481, 482; 340/149 A

[56] References Cited

U.S. PATENT DOCUMENTS

| | | | |
|---|---|---|---|
| 3,072,397 | 1/1963 | Kelchner | 271/274 |
| 3,527,406 | 9/1970 | Snellman | 235/475 |
| 3,562,495 | 2/1971 | Grippi | 235/475 |
| 3,629,556 | 12/1971 | Orzechowski | 235/475 |
| 3,836,753 | 9/1974 | Pass | 235/475 |
| 3,964,739 | 6/1976 | Garcia | 271/274 |
| 4,034,976 | 7/1977 | Lundblad | 271/274 |

Primary Examiner—Robert M. Kilgore
Attorney, Agent, or Firm—Woodcock, Washburn, Kurtz, Mackiewicz & Norris

[57] ABSTRACT

A reader for reading encoded data on cards, badges and the like, which cards and badges can be of differing thicknesses, having specially adapted drive roller pairs each comprising a drive roller of a first durometer and a pinch roller of a second durometer, arranged to efficiently capture the badge or card and apply a positive drive force to it. The drive roller is fixed in position and of a relatively high durometer, while the pinch roller is at contact with the drive roller in the absence of a transported card or badge, but is adapted to be displaced against a spring force to accommodate the thickness of the badge or card being read. The efficiency of capture is a function of the relative durometers of the two respective rollers of the drive roller/pinch roller pair, as well as the degree of spring force provided on the pinch roller.

8 Claims, 4 Drawing Figures

READER WITH SPECIAL MEANS FOR TRANSPORTING CARDS AND BADGES OF VARIABLE THICKNESSES

BACKGROUND OF THE INVENTION

This invention relates to reader apparatus for the reading of documents such as tab cards and badges, such documents having a thickness within a relatively wide range, and in particular reader apparatus adaptable to efficiently transport for reading documents within such a wide range of thicknesses.

In the field of document reading devices, there is an increasing need for readers designed to efficiently process different types of documents, e.g., conventional tab cards, badges, and the like. In the electronic data processing industry, there is a proliferation of systems customized to meet particular needs of data gathering and processing, wherein a large number of one-at-a-time type readers are utilized. Such systems are, for instance, particularly adaptable to large industrial operations where there is a need to plug in a large number of occasionally used data sources at different locations. Frequently, in these systems, the data is encoded on a badge which is worn or carried by a person, which badge is periodically inserted into the reader either for recording of data or for recording of an event. At the same time, it is desirable that the system be able to accommodate other types of documents, such as conventional tab cards. A tab card has a thickness within a range of 0.006 to 0.009 inch, and is typically 0.007 inch in thickness. By contrast, both type 3 and type 5 badges, which find wide acceptance in present day EDP systems, have a thickness within a range of 0.018 to 0.030 inch. Further, badges which include embossing can have a total thickness of up to about 0.048 inch. It is thus seen that a single system may require reader devices capable of accommodating data 20 documents having thickness within a range of about 0.006 to 0.048. Heretofore, readers have been designed with great precision to accommodate a document of only a predetermined thickness. The requirement to be automatically adaptable to receive documents of different thicknesses creates a great need for a reliable and efficient reader device, without which the system capability is severely limited.

SUMMARY OF THE INVENTION

It is a primary object of this invention to provide a reader apparatus which is automatically adaptable to efficiently accept and process documents, including cards and badges, of varying thicknesses, which apparatus is extremely simple and reliable.

It is another object of this invention to provide a transport system for use in data readers and the like, which transport system comprises one or more pairs of rollers, which rollers are arranged to jointly capture the document and provide a positive driving force thereto.

It is another object of this invention to provide a drive roller-pinch roller combination adapted to capture and apply positive driving force to badges and cards which have varying thicknesses and different surface coefficients of friction.

In accordance with the above objects, there is provided a reader apparatus having a transport system adapted to capture and transport a card or badge through a predetermined transport path, the transport mechanism having at least one pair of rollers comprising a drive roller and a pinch roller, the rollers being adapted to efficiently capture and drive cards and badges of varying thicknesses. The drive roller has a first, relatively high durometer, and the pinch roller has a second, relatively low durometer, the pinch roller being movable against a spring force, and positioned relative to the fixed drive roller such that the card or badge is captured in the nip of the roller pair prior to movement of the pinch roller to accommodate the thickness of the badge or card.

DESCRIPTION OF THE PREFERRED EMBODIMENTS

Reference is made to copending U.S. application Ser. No. 705,248, ONE-AT-A-TIME CARD READER, filed July 14, 1976 and assigned to the same assignee. This application is now issued as U.S. Pat. No. 4,145,606, and is incorporated herein by reference. The referenced patent shows, at FIG. 2, a diagram of a three roller-pair transport mechanism for transporting cards and the like in a one-at-a-time device. FIG. 2 of the referenced patent shows a typical drive system for driving the three roller pairs.

Figure 1:
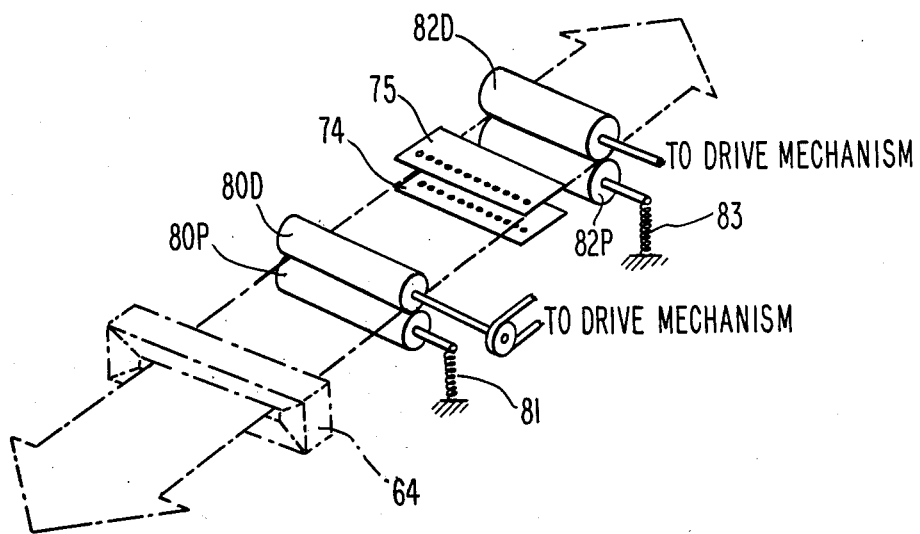
FIG. 1 is a perspective drawing showing the transport mechanism of this invention comprising two drive roller/pinch roller pairs.
Figure 2A:
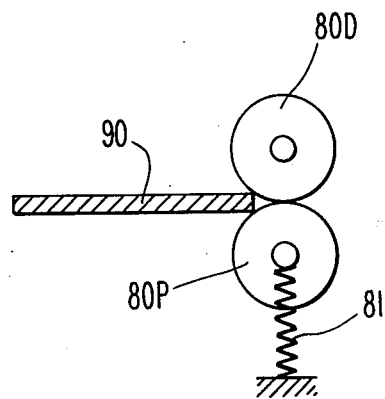
FIG. 2A is a schematic diagram showing the relationship of the drive roller and pinch roller of a roller pair of this invention, with a badge or card just entering the nip of the roller pair.

Referring now to FIG. 1, there is shown a schematic representation of two roller pairs 80, 82, arranged relative to the reader input 64 in the same manner as shown in the referenced patent. A first roller pair comprises drive roller 80D and pinch roller 80P. Drive roller 80D is fixed in position while pinch roller 80P is free to move vertically downward, i.e., away from pinch roller 80D. As illustrated in FIG. 2A, under normal circumstances with no card or badge being read, rollers 80D and 80P are in contact with each other. Pinch roller 80P has attached thereto a spring 81, adjusted to provide nominally about 8–16 ounces of spring bias force, the spring force constraining downward movement of pinch roller 80P away from drive roller 80D. The second roller pair 82D, 82P is configured in the same manner. Drive rollers 80D and 82D are both connected to a suitable drive mechanism, not shown. A read head comprised of light emitter board 74 and light sensor board 75 is shown positioned between roller pair 80 and roller pair 82. It is to be understood that additional roller pairs may be provided, depending upon the length of the card, badge or document to be handled, and/or the transport path desired.

It is noted that the distance between the roller pairs, through necessity, must be a length less than the shortest length card or badge to be read, i.e., about 2.00 inches. Since the read head must be located between the two roller pairs, the diameter of the drive rollers is limited. If extremely large diameter rollers could be accommodated, the problem of accepting different size documents would be less severe. However, the smaller the drive roller, the more difficult it is to reliably transport thicker documents. For drive rollers having a diameter no more than about one inch, standard roller pairs cannot reliably and consistently transport documents of the varying thicknesses handled by this invention. Note that the drive rollers are mechanically connected to a strobe device that tracks the position of the document, so it is a condition that the drive roller must have an accurate and fixed diameter, i.e., it is substantially non-deformable.

Further examining the characteristics of each roller pair, the drive roller is preferably constructed of urethane, which gives a desired hardness and coefficient of friction. The drive roller preferably has a durometer in the range of shore A 70-90, although it can be higher. By contrast, the pinch roller, also made of urethane, has a durometer in the range of about 35-45. The durometers of both the drive roller and the pinch roller may be slightly higher or lower than the indicated ranges, but it is essential that the ratio of the drive roller durometer compared to the pinch roller durometer is much greater than 1, and preferably at least about 2:1. As previously specified, the spring 81, 83 provides a bias force of about 8-16 ounces, which is substantially constant force for the range of movement of the pinch roller. As a general proposition, the lower the durometer of the pinch roller, the greater should be the spring force.

Figure 2B:
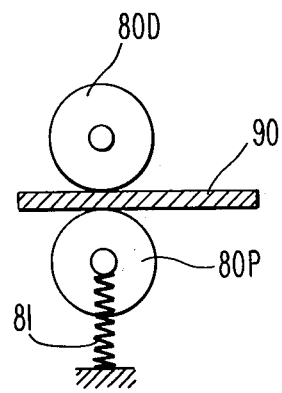
FIG. 2B is a schematic diagram of the same roller pair arrangement as FIG. 2A, wherein the badge has been captured by the roller pair and is being driven thereby.

Referring now to FIGS. 2A and 2B, the efficiency of the simple pinch roller arrangement, for purposes of transporting cards and badges of different thicknesses, can be appreciated. As illustrated in FIG. 90, a card, badge or other type document is shown as having its forward edge right at the nip of rollers 80D, 80P, the two rollers still being held just in contact by spring 81. Due to the relative softness of pinch roller 80P, the leading edge of the card or badge (which is being manually or otherwise pushed into the reader apparatus) penetrates into pinch roller 80P, such that pinch roller 80P is able to grab it, i.e., apply horizontal driving force to it. As the badge or card is drawn within the nip, drive roller 80D is substantially non-deformable, such that the card or badge pinch roller 80P to deform downward against the bias force of spring 81. In FIG. 2B, the badge or card 90 is shown positioned within the two rollers, each roller being in good contact with an opposite surface. It is seen that, for a wide variety of thicknesses of badge/card 90, the operation is precisely the same, i.e., the card or badge penetrates pinch roller 80P, causing such roller to apply positive drive force to it and thrust it between the two rollers. This in turn forces pinch roller 80P down against the force of spring 81, whereupon positive drive is applied by the roller pair. Of course, it can be seen that the roller pair operates equally efficiently whether the badge or card approaches from the left or the right. The important point is that the durometer of the pinch roller be sufficiently low such that the badge or card penetrates it before spring 81 retreats, so that the badge or card gets pulled through the roller pair.

Figure 3:
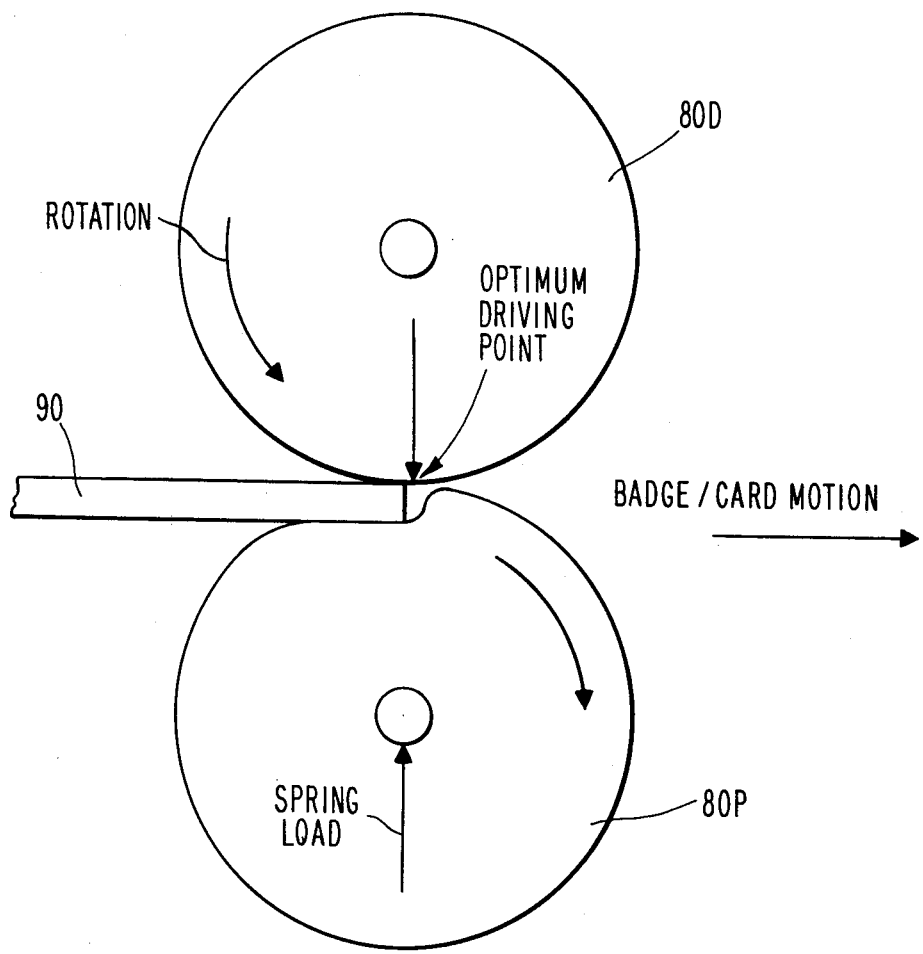
FIG. 3 is a schematic diagram illustrating the operation of the roller pair at the optimum driving point.

Further illustrating the effectiveness of the invention, reference is made to FIG. 3. The object of the improved roller pair is to permit the document 90 to reach the optimum driving position before the pinch roller 80P loses contact with the drive roller 80D. If the pinch roller is relatively undeformable it is pushed away from the drive roller by the document, thereby losing the driving force gained through contact with the drive roller before the document reaches the optimum driving position. However, the lower durometer pinch roller deforms as illustrated in FIG. 3, so that ideally the pinch roller still has contact with the drive roller when the leading edge of document 90 reaches the optimum driving point. The optimum condition exists when the durometer and the spring force combination allow the document/badge to be transported (i.e., driven) by both the drive roller and the pinch roller until it is directly under the center line of the roller pair. To achieve this, the pinch roller must deform by about the thickness of the badge while the spring holds the pinch roller in contact with the non-deformed drive roller.

As used in the claims appended hereto, the term "badge or card" means either a conventional badge, card (of paper stock or otherwise, including magnetic cards) or other document which is used for carrying encoded data. Such a badge or card can, in addition to having a thickness which is variable through a relatively wide range, have different surface coefficients of friction, such as exist between relatively rough paper cards and relatively shiny badges. The simple, efficient roller pair arrangement of this invention is substantially insensitive to the surface coefficient of friction of the badge or card, due to the relative differences of durometer and the spring loaded pinch roller.

In the preferred embodiment at least two roller pairs are employed, as illustrated in FIG. 1. However, any number of roller pairs may be used, depending upon the reader transport path. For a reversing cycle reader, where the card or badge returns to the input, all roller pairs should be of the type 80D-80P, 82D-82P, to insure good transport in each direction. It is noted that increased speed facilitates pushing different thickness documents through the roller pair. However, for drive velocities up to about 50 inches per second, the subject invention provides a great enhancement in performance.

I claim:

1. A badge or card reader for reading badges and cards having thicknesses with a range of about 0.048 inch, having a transport mechanism for transporting a badge or card over a predetermined path, said transport mechanism comprising at least one roller pair for applying transporting force, said roller pair being characterized by a drive roller mounted on a first fixed shaft and of a first relatively high durometer, a pinch roller on a second shaft movable relative to said drive roller and of a second relatively low durometer, the ratio of said relatively high durometer to said relatively low durometer being at least about 2:1, and biasing means for biasing said pinch roller toward said drive roller.

2. The reader as described in claim 1, wherein said transport mechanism comprises at least two of said roller pairs.

3. The reader as described in claim 1, wherein said pinch roller durometer is sufficiently low to permit penetration of a badge or card into the surface thereof.

4. The reader as described in claim 1, wherein said biasing means comprises spring means for applying a biasing spring force, said spring means allowing movement of said pinch roller relative to said drive roller in said range of about 0.048 inch.

5. The reader as described in claim 4, wherein said spring means provides a biasing force of about 8-16 ounces.

6. The reader as described in claim 4, wherein said relatively high durometer is at least about 70-90, and said relatively low durometer is less than about 35-45.

7. In a reader for reading badges or cards of widths within a range of 0.048 inch, a transport drive mechanism comprising a plurality or roller pairs, each roller pair having a drive roller mounted on a fixed shaft and having a durometer of at least 70, a pinch roller normally in contact with said drive roller and movable relative to said drive roller, said pinch roller having a durometer which is at least twice as low as said drive roller durometer, and biasing means for biasing said pinch roller toward said drive roller, whereby a card or badge which is introduced to the nip of each of said roller pairs penetrates said pinch rollers sufficiently to be grabbed and transported by said roller pairs, whereupon said pinch rollers are forced to move against said biasing means sufficiently to accommodate said card or badge between the two rollers of each of said pairs.

8. The reader as described in claim 7, comprising drive means to drive said drive rollers at a speed of less than 50 inches per second, and wherein said biasing means provides a biasing force in the range of 8-16 ounce.

* * * * *